United States Patent
Springer et al.

(10) Patent No.: US 12,311,749 B2
(45) Date of Patent: May 27, 2025

(54) COOLING DEVICE FOR A MOTOR VEHICLE

(71) Applicant: Brose Fahrzeugteile SE & Co. Kommanditgesellschaft, Würzburg, Würzburg (DE)

(72) Inventors: Nils Springer, Oldenburg (DE); Thomas Dreesen, Oldenburg (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 471 days.

(21) Appl. No.: 17/603,968

(22) PCT Filed: Apr. 15, 2020

(86) PCT No.: PCT/EP2020/060525
§ 371 (c)(1),
(2) Date: Nov. 12, 2021

(87) PCT Pub. No.: WO2020/212382
PCT Pub. Date: Oct. 22, 2020

(65) Prior Publication Data
US 2022/0194215 A1    Jun. 23, 2022

(30) Foreign Application Priority Data
Apr. 15, 2019  (DE) .................. 10 2019 205 431.5

(51) Int. Cl.
*B60K 11/08*         (2006.01)
*H02K 9/16*          (2006.01)

(52) U.S. Cl.
CPC ............ *B60K 11/085* (2013.01); *H02K 9/16* (2013.01)

(58) Field of Classification Search
CPC ....... B60K 11/085; B60K 11/04; B60K 11/06; H02K 9/16; F01P 2050/24; F01P 7/12;
(Continued)

(56) References Cited

U.S. PATENT DOCUMENTS 5,205,484 A * 4/1993 Susa .................. F01P 7/12
                                              165/294
5,269,264 A * 12/1993 Weinhold ............ F01P 11/10
                                              123/41.05
(Continued)

FOREIGN PATENT DOCUMENTS

DE   102005024444 A1   12/2005
DE   102005041595 A1    3/2006
(Continued)

OTHER PUBLICATIONS

Chinese Office Action for 202080029080.7, English Google Machine Translation attached to original, Dated Aug. 1, 2023, All together 18 Pages.
(Continued)

*Primary Examiner* — Kurt Philip Liethen
(74) *Attorney, Agent, or Firm* — Dickinson Wright PLLC (57) ABSTRACT

A cooling device for cooling an electrically driven or driveable motor vehicle, having a first heat exchanger and a second heat exchanger, having an air-guiding channel which connects the first heat exchanger and the second heat exchanger and which has two diametrically oppositely situated passage openings which are reversibly closable by means of a first air guide and by means of a second air guide, and having a cooler fan which is arranged downstream of the second heat exchanger in terms of flow.

14 Claims, 2 Drawing Sheets

(58) Field of Classification Search
CPC ......... F01P 5/06; B60L 58/26; H01M 10/613; H01M 10/625; H01M 10/6563
See application file for complete search history.

(56) References Cited

U.S. PATENT DOCUMENTS

| | | | |
|---|---|---|---|
| 5,839,397 A | | 11/1998 | Funabashi et al. |
| 7,310,961 B2 | | 12/2007 | Hoshi et al. |
| 7,950,443 B2 | * | 5/2011 | Rasset .................. F28F 9/002 |
| | | | 165/41 |
| 10,252,611 B2 | * | 4/2019 | Errick .................. B60K 11/085 |
| 10,479,168 B2 | * | 11/2019 | Running ............ B60H 1/00764 |
| 11,065,951 B2 | * | 7/2021 | Moestam .............. B60K 11/085 |
| 2001/0004090 A1 | * | 6/2001 | Yamashita ......... B60H 1/00764 |
| | | | 237/12 |
| 2013/0316634 A1 | | 11/2013 | Ajisaka |
| 2014/0182956 A1 | | 7/2014 | Morey et al. |
| 2014/0356666 A1 | | 12/2014 | Murata et al. |
| 2016/0361990 A1 | | 12/2016 | Porras et al. |
| 2018/0029463 A1 | | 2/2018 | Ajisaka |
| 2019/0009647 A1 | | 1/2019 | Huenemoerder |
| 2019/0031199 A1 | * | 1/2019 | Dudar .................. B60K 11/085 |
| 2021/0155074 A1 | * | 5/2021 | Vaddiraju .............. B60K 11/02 |
| 2022/0194215 A1 | * | 6/2022 | Springer .................. F01P 5/06 |

FOREIGN PATENT DOCUMENTS

| | | |
|---|---|---|
| DE | 102007036475 A1 | 2/2009 |
| DE | 102009042443 A1 | 3/2011 |
| DE | 102013006499 A1 | 10/2014 |
| DE | 10201600761 A1 | 7/2016 |
| JP | S5894573 A | 6/1983 |
| JP | S601918 U | 1/1985 |
| JP | S63270228 A | 11/1988 |
| JP | H04189626 A | 7/1992 |
| JP | 2006002631 A | 1/2006 |
| JP | 2006069383 A | 3/2006 |
| JP | 2016078746 A | 5/2016 |
| JP | 2016190533 A | 11/2016 |
| JP | 2018007317 A | 1/2018 |

OTHER PUBLICATIONS

Japanese Office Action for Japanese Application No. 2021-560875 dated Dec. 21, 2022, English translation attached to original, All together 25 Pages.

Korean Office Action for KR 1020217037018 dated Oct. 16, 2023, Google English Machine Translation attached to original, All together 22 Pages.

Japanese Office Action for JP 2021-560875 dated Oct. 2, 2023, English Translation attached to original, All together 6 Pages.

Notice of Allowability for European Application No. 20 720 766.3 dated Jan. 3, 2024, English Translation attached to original, All together 74 Pages.

Korean Notice of Allowance for KR Application No. 10-2021-7037018, English Translation attached to original, Dated Jan. 13, 2025, All together 6 Pages.

* cited by examiner

COOLING DEVICE FOR A MOTOR VEHICLE

CROSS-REFERENCE TO RELATED APPLICATIONS

This application is the U.S. National Phase of PCT Application No. PCT/EP2020/060525 filed on Apr. 15, 2020, which claims priority to German Patent Application No. DE 10 2019 205 431.5, filed on Apr. 15, 2019, the disclosures of which are hereby incorporated in their entirety by reference herein.

TECHNICAL FIELD

The present disclosure relates to a cooling device for cooling an electrically driven or drivable of a motor vehicle, such as an electric vehicle having an electric motor which is fed by a chargeable battery, or a hybrid vehicle having an electric motor and having an internal combustion engine.

BACKGROUND

Cooling devices of an internal combustion engine, in particular of a motor vehicle, mainly discharges heat which is released to the combustion chamber walls or cylinder walls. Since excessively high temperatures would damage the engine, the internal combustion engine must be cooled. Modern internal combustion engines, in particular four-stroke engines in motor vehicles, are, at most with few exceptions, liquid-cooled, wherein a mixture of water, antifreeze agent and corrosion-prevention agent is generally used as coolant for maintaining the operating temperature of the internal combustion engine and also for the operation of an air-conditioning system.

The coolant, which is conducted in pipes incorporated into the cooler network or cooler assembly of a cooler, has to in turn be cooled, for which purpose cooling air passes over cooling ribs which exchange heat with the coolant. Since it is the case in particular at low speeds of the motor vehicle that the relative wind serving as cooling air is not normally sufficient for cooling.

SUMMARY

The present disclosure is based on one or more objects such as providing a suitable cooling device (cooling module) for an electrically driven or drivable motor vehicle, such as for an electric or hybrid vehicle. Furthermore, the present disclosure provides a method for operating such a cooling device which works as effectively (effectively in terms of power) as possible in all the working ranges of the motor vehicle. As an example, the intention is for the noise generation of the cooling device (cooling module) to be as low as possible, that is to say for the latter to work with the least possible noise (as quietly as possible), during charging operation of the battery of an electromotive drive provided.

The cooling device according to one or more embodiments may be suitable and configured for cooling an electrically or electromotively driven or drivable motor vehicle, such as an electric or hybrid vehicle. In this case, the motor vehicle has an electric motor which is fed by a chargeable battery, wherein the cooling device (also referred to hereinafter as cooling module) is provided for cooling the battery and the electric motor.

The cooling device has a first heat exchanger and a second heat exchanger. The heat exchangers may be configured to be separate from one another. In this case, the heat exchangers may collectively form a cooler network, or cooler assembly, through which coolant flows, that is to say in the form of a cooler. The heat exchangers may be connected for example to a common cooling circuit of the motor vehicle. This means that the heat exchangers are arranged, for example, spatially separated from one another, but may be coupled to one another in terms of a flow of coolant.

The cooling device furthermore has an air-guiding channel which connects the first heat exchanger and the second heat exchanger. Here, the air-guiding channel connects the heat exchangers in terms of flow or in terms of flow dynamics. This means that an air stream is or can be guided between the heat exchangers by means of the air-guiding channel. The air-guiding channel has two diametrically opposite passage openings which can be reversibly closed off or opened up by a first air guide and a second air guide. The passage openings may be arranged in the region of the second heat exchanger.

A cooler fan may be arranged behind the second heat exchanger in terms of flow or in terms of flow dynamics. In other words, the cooler fan is arranged behind the second cooler or heat exchanger in the airflow direction of the cooling air and, in this case, being in a parallel plane in relation to the rear side thereof. Here, the axial intake opening of the cooler fan faces the second cooler or heat exchanger, or the rear side thereof.

Through the arrangement of the heat exchangers, the air-guiding channel and the cooler fan, such as a cooling device for an electrically or electromotively driven or drivable motor vehicle is realized. As an example, movable air guides may provide or form different flow paths for a guided air stream can be realized, which makes possible optimum cooling according to the operating situation of the motor vehicle.

Below, information pertaining to the spatial directions, including a coordinate system of the motor vehicle (vehicle coordinate system), is given with regard to an exemplary installation situation between a cooler grille and an electric motor or a battery. The abscissa axis (X-axis, X-direction) is in this case oriented along the vehicle longitudinal direction (direction of travel), and the ordinate axis (Y-axis, Y-direction) is oriented along the vehicle transverse direction, and the applicate axis (Z-axis, Z-direction) is oriented along the vehicle height.

The first heat exchanger and the second heat exchanger form the face sides of the elongate, substantially cylindrical or tubular air-guiding channel, and the passage openings and their respectively assigned air guide may be arranged diametrically opposite one another on the side surfaces of the air-guiding channel. The passage openings are formed in the side walls so as to be oriented approximately transversely or radially with respect to the longitudinal direction, extending between the heat exchangers, of the air-guiding channel. With respect to the vehicle height (Z), the passage openings are arranged, for example, on an upper side and a lower side of the air-guiding channel.

In one or more embodiments, the air guides may be in the form of a flap or cover that may be configured to be pivoted or moved about a rotation or pivot axis, for example in the form of a diverting plate or diverting flap. In this case, the air guides can each be moved or pivoted between a closed position and an open position. In the closed position, the air guides bear against the side walls of the air-guiding channel in such a way that the assigned passage opening is covered or closed off in terms of flow. Consequently, in the closed position, no air stream can flow through the assigned passage opening. In the respective open position, the air guides have been pivoted or moved in such a way that the passage openings are at least partially open, whereby an air stream can flow therethrough. In order to be opened, the air guides are moved or pivoted, for example, away from the air-guiding channel.

With respect to the direction of travel of the motor vehicle (X), that is to say with respect to the main movement direction thereof, the heat exchangers have a front side and a rear side. The front side of the first heat exchanger in this case faces, for example, a vehicle-front-side cooler grille, and the rear side of the first heat exchanger faces the air-guiding channel and thus the second heat exchanger. The front side of the second heat exchanger faces the air-guiding channel and the rear side of the first heat exchanger, and the rear side of the second heat exchanger faces the inlet of the radial fan.

In one or more embodiments, the cooler fan may be a radial fan. In other words, the radial fan may be arranged as cooler fan behind the second heat exchanger in terms of flow or in terms of flow dynamics.

A radial fan is to be understood here and below as being a cooler fan by which cooling air is sucked in axially and—after being diverted (diverted through 90°)—conveyed out radially. This means that the radial fan conveys outwardly (blows out) in a radial direction. By contrast to axial fans, radial fans exhibit relatively low noise generation. As an example, radial fans achieve significantly lower sound pressure levels with the same air power. In this way, a noise-reduced cooling device is realized.

Here, "axial" is to be understood as meaning a direction parallel to (coaxial with) the rotation axis (axial direction) of the radial fan, and "radial" is to be understood as meaning a direction perpendicular (transverse) to the rotation axis (radial direction) of the radial fan. The fan rotation axis, in turn, extends in the longitudinal direction with respect to the guiding channel, that is to say approximately parallel to the direction of travel of the motor vehicle.

In one or more embodiments, the radial fan may be arranged in a lower region of the motor vehicle, whereby a further reduction in the noise generation is brought about during operation.

In another embodiment, the cooler fan (also referred to hereinafter as radial fan) of the cooling device may be driven electromotively. For a relatively space-saving configuration of the radial fan, such as, for the smallest possible structural size of the cooler fan in the axial direction, the electric motors serving for driving the impellers thereof are arranged for example in a fan hub of a radial impeller of the radial fan. In this way, a radial fan which is relatively compact in terms of structural space is realized.

In yet another embodiment, the cooling device has no axial fan. In other words, the cooling device is configured to be without an axial fan. Consequently, the radial fan is the only cooling fan of the cooling device present. This may provide a relatively low-noise (quiet) cooling device.

In one or more embodiments, the second heat exchanger may be arranged inclined at an inclination angle in relation to the first heat exchanger. This means that the heat exchangers are arranged not parallel but rather obliquely or tilted with respect to one another. For example, the second heat exchanger is arranged inclined at an inclination angle of 30° to 60°, such as approximately 45°, in relation to the first heat exchanger.

Due to the inclination of the second heat exchanger, the flow behavior of the cooling device, such as with respect to an air stream entering the air-guiding channel through the second passage opening, may be improved. As an example, less swirling or turbulence thus occurs in the region of the second heat exchanger.

In another embodiment, the second heat exchanger has a reduced cross-sectional area in comparison with the first heat exchanger. In other words, the second heat exchanger has a smaller flow cross section than the first heat exchanger.

In one or more embodiments, the first air guide may be arranged to oppose and so as to be rotated by 180° with respect to the second air guide. This means that the air guides are arranged approximately point-symmetrically with respect to one another. In this way, an arrangement of the air guides that may be advantageous in terms of flow is realized. The opening or pivot angles of the air guides are in this case matched, for example, to the available structural space of the desired installation position.

The air guides are for example in the form of flaps articulated in the manner of a hinge joint. Here, the air guides have a rotary joint or pivot joint as fixed end and a flap blade which can be moved or pivoted by way thereof. The rotary or pivot axes of the air guides are oriented parallel to one another. The air guides are arranged so as to be rotated through 180° with respect to one another, and so they are articulated on the air-guiding channel in substantially opposite directions. The joint of the first air guide may be arranged, for example, offset toward the first heat exchanger such that, in the closed position, the free end of the flap blade of the first air guide is arranged in the region of the second heat exchanger. The joint of the second air guide is arranged in the region of the second heat exchanger such that, in the closed position, the free end of the flap blade of the second air guide is oriented toward the first heat exchanger.

In another embodiment, provision is made of a closure device for closing off the first heat exchanger in terms of flow. The closure device is for example in the form of a louvered screen or in the form of a flap system. By way of the closure device, the first heat exchanger and thus a face side of the air-guiding channel can be closed off in terms of flow, so that no air stream can enter the air-guiding channel from this side. In this way, it is for example possible merely to guide an air stream via the second passage opening to the second heat exchanger and to the radial fan, which, for example, in operating situations with only low or moderate cooling requirements, such as for example in the case of slow driving or in the case of stationary operation at moderate outside and ambient temperatures, is advantageous. In this way, a relatively low-noise arrangement which is favorable in terms of flow may be realized.

In a suitable embodiment, the air-guiding channel may be switched between three different flow paths by way of the air guides and/or the cooler fan and also the closure device, for example. The conjunction "and/or" is to be understood here and below such that the features linked by means of this conjunction can be formed both together and as alternatives to one another.

By way of the closure device and the two air guides and also the radial fan, the air-guiding channel for the guided or conveyed air stream may act in the manner of a three-way valve. As an example, it is thereby possible for different cooling powers to be realized in a simple manner according to driving or operating situation, such that optimum and effective cooling of the electric motor and/or the battery is ensured at all times.

The first flow path may be formed with the closure device open and the air guides closed and also with the radial fan switched on. The first flow path thus extends from the first heat exchanger to the second heat exchanger and the radial fan. Consequently, during the operation of the radial fan, in this position/setting of the cooling device, air is sucked in via both heat exchangers, so that a relatively high cooling power is possible. This may be advantageous, for example, during charging or rapid charging operation of the battery. Due to the high-pressure build-up, out of principle, by means of the radial fan, high cooling power with low power consumption is possible. In this way, a relatively low-noise operation of the cooling device with simultaneously high cooling power is realized.

The second flow path may be formed with the closure device open and the first air guide open and also with the second air guide closed and the radial fan switched off. With the radial fan switched off or not operated, it acts in a blocking manner with regard to an axial air stream. Consequently, the air stream is blocked in the direction of the radial fan or in the direction of the second heat exchanger. The air stream is thus guided out via the first passage opening through the air-guiding channel from the first heat exchanger. This setting/position of the cooling device may be advantageous, for example, during a driving operation of the motor vehicle, in which the air stream generated by the relative wind can be guided in a fan-free manner via the first heat exchanger. The relative wind may flow freely through the first heat exchanger. Since no fan is arranged as flow resistance behind the first heat exchanger, a high cooling power can be achieved in a fan-free manner in this position of the cooling device.

The third flow path may be formed with the closure device closed and the first air guide closed and also with the second air guide open and the radial fan switched on. In this way, the air is sucked in via the second passage opening to the second heat exchanger. A relatively low-noise operation of the cooling device that, through the closure of the first heat exchanger, may also be advantageous in terms of flow is thus made possible, this may be suitable for low cooling requirements.

As an example, combinations of these three positions or flow paths are also possible. The switching between the positions or flow paths may be realized for example, continuously, and so, in principle, it is also the case that any intermediate position between the flow paths is possible.

In another embodiments, the first air guide may be actuated in a pressure-controlled manner. In other words, the first air guide may be pivoted in a pressure-controlled manner between the closed position and the open position. In this way, passive control of the first air guide is realized, so that a cost-effective cooling device with reduced complexity is made possible.

Here, the first air guide may be in the form of a dynamic pressure flap and designed and dimensioned so as to be pushed open with sufficiently strong relative wind. In other words, the first air guide opens the first passage opening of its own accord if the relative wind reaches a sufficient speed. In this way, it is possible to switch between the first and second flow path of the cooling device without an additional actuation means.

In one or more embodiments a controller is provided, that is to say a control unit, which may be configured for activating, and/or regulating, the first air guide and/or the second air guide, and also the radial fan and the closure device, as required. The controller may be configured in a manner dependent on the driving operation (driving cycle) or on the working range of the motor vehicle. This means that the air guides and the closure device and also the radial fan are actively controllable and/or regulable as components of the cooling device by the controller.

Here, the controller is generally—in terms of programming and/or circuitry—configured for activating the components. The controller may be configured to open or to close the closure device and/or the air guides, and to switch the radial fan on and off, that is to say to switch between the three flow paths, in a manner dependent on the respective operating situation, that is to say in a manner dependent on the driving operation or on the working range.

In one or more embodiments, the controller may be formed, at least at its core, by a microcontroller having a processor and having a data memory, in which the functionality for carrying out the activation of the components is implemented in terms of programming in the form of operating software (firmware), such that the method—possibly in interaction with a device user—is carried out automatically upon execution of the operating software in the microcontroller.

Within the context of the present disclosure, the controller may alternatively also be formed however by a non-programmable electronic component, such as for example an application-specific integrated circuit (ASIC), in which the functionality for carrying out the activation of the components is implemented using circuitry means.

The present operating situation, that is to say the driving operation or the working range of the motor vehicle, may be detected, and sent to the controller, via external sensor(s), external or not a part of the cooling device. Here, the operating situation is determined for example on the basis of the vehicle speed, the temperature of the coolant, the requirements for the (vehicle) air-conditioning system, and/or the battery temperature.

In another embodiment, a threshold value of the vehicle speed or of the working range may be predefined. The threshold value is suitably stored in a memory of the controller. Above the threshold value, the first air guide is open and the second air guide is closed and also the radial fan is switched off. In other words, above the threshold value, the second flow path is set. Below the threshold value, the first air guide and the second air guide, for example, during charging operation of a battery for an electromotive drive of the motor vehicle, are closed and the radial fan is switched on. This means that, if there is a fall below the threshold value, the cooling device switches to the first flow path. This may provide expedient and constantly cooling-optimized operation of the cooling device and of a motor vehicle provided therewith.

The method according to the present disclosure may be suitable and configured for operating the above-described cooling device. The method may be carried out by the controller. In other words, the controller is suitable and configured for carrying out the method according to the invention.

According to the method, it is provided that the radial fan is operated, and/or the first air guide and/or the second air guide are/is actuated, in a manner dependent on the working range, on the electromotive load, on the respective driving cycle and/or on the speed of the motor vehicle. In this way, a particularly suitable method for operating the cooling device is realized.

In another embodiment, above a threshold value of the speed of the motor vehicle, the radial fan may be switched off and also the first air guide is opened and the second air guide is closed. Thus, the cooling device, for example in the case of high-speed driving, is set to the second flow path. In the case of a relatively high, high and/or maximum vehicle speed, that is to say in the case of high-speed driving or in the case of high loading of the electric motor, for example in the case of uphill driving and/or in the case of additional stress due to a trailer pulled by the vehicle, the passive operation by way of the flow of relative wind through the first heat exchanger is particularly suitable for cooling the electric motor.

Below the threshold value of the speed, for example in the case of slow driving or of a standstill of the motor vehicle, the first air guide is closed and the second air guide is opened and also the radial fan is switched on. In this way, a sufficient cooling power is ensured for example at a red traffic light or in a traffic jam, in the case of which there is insufficient relative wind for cooling.

In one or more embodiments of the method, in the case of a motor vehicle having an electric motor which is fed by a chargeable battery, both air guides are closed, and the radial fan is operated or switched on, during the charging operation of the battery. Thus, during the charging operation, the cooling device is set to the first flow path. In this way, the air conveyed by the radial fan is guided both through the first heat exchanger and through the second heat exchanger, so that a relatively high cooling power is made possible. Consequently, the battery is also cooled reliably and operationally safely during a rapid charging process. With the electromotive radial fan, the ratio of (aerodynamic) cooling power and (electrical) power consumption is particularly favorable in particular during charging operation, that is to say the radial fan in this case works particularly efficiently.

BRIEF DESCRIPTION OF THE DRAWINGS

An exemplary embodiment of the invention is discussed in more detail below on the basis of a drawing. In the drawing, in schematic and simplified illustrations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known cooling device is provided in DE 10 2013 006 499 U1, that discusses an arrangement of an axial fan, within a cooler shroud, on the cooler comprising the cooling ribs. The electromotively driven axial fan generates an additional air stream, wherein the cooler shroud has a number of dynamic pressure flap openings which can be closed off by dynamic pressure flaps. With open dynamic pressure flaps and relatively high vehicle speeds, a reduced coverage of the cooling surface and also a large surface through which flow can pass freely and thus an increased cooling power are enabled owing to a low degree of blockage.

In the direction of travel, the axial fan is typically arranged behind the cooler network or cooler assembly of the cooler (heat exchanger). With the aid of a fan wheel of the fan, the air is sucked through the cooler network and directed to the internal combustion engine. If, in addition to the cooler network, a condenser network of a condenser of an air-conditioning system is also present, then it is normally the case that the condenser network is arranged before the cooler network in the direction of the relative wind (airflow direction).

Electrically or electromotively driven or drivable motor vehicles, such as for example electric or hybrid vehicles, normally comprise an electric motor as an electrical drive system, by way of which electric motor one or both vehicle axles can be driven. For the purpose of a supply with electrical energy, the electric motor is typically coupled to a vehicle-internal (high-voltage) battery as an electrical energy store. A battery is to be understood here and below as being in particular a rechargeable electrochemical secondary battery, for example a storage battery.

Such electric motors, as electric drive machines, generate relatively little waste heat during operation, whereby, in comparison with internal combustion engines, only a low cooling power of the cooling device is required. However, in the case of electrically driven or drivable motor vehicles, there occurs the additional problem that the battery starts to degenerate at a high battery temperature, for example higher than 45° C. This means that, at temperatures increased in this manner, there occur within the battery electrochemical reactions which damage or completely destroy the battery.

For the purpose of improving electromobility, so-called rapid charging operations, during which the vehicle-internal battery is charged within the shortest possible period of time, are commonly desired in electric or hybrid vehicles. In the course of such rapid charging, there occur relatively high current intensities, which consequently cause the battery temperature to increase during the charging process.

The charging of the battery is generally realized with the vehicle at a standstill, and so no relative wind is available for cooling. In order to improve the cooling power during (rapid) charging operation of the battery, it is possible for example to generate, by means of an axial fan, a cooling air stream through a heat exchanger. Disadvantageously, however, a relatively high noise load is brought about by such an axial fan.

Furthermore, during charging operation, conventional cooling devices have relatively low cooling power owing to absence of relative wind, whereby it is thus frequently necessary to reduce the current intensity of the charging current after a certain charging time in order to avoid overheating and degradation of the battery. In this way, charging times of the motor vehicle are disadvantageously increased.

Figure 1:
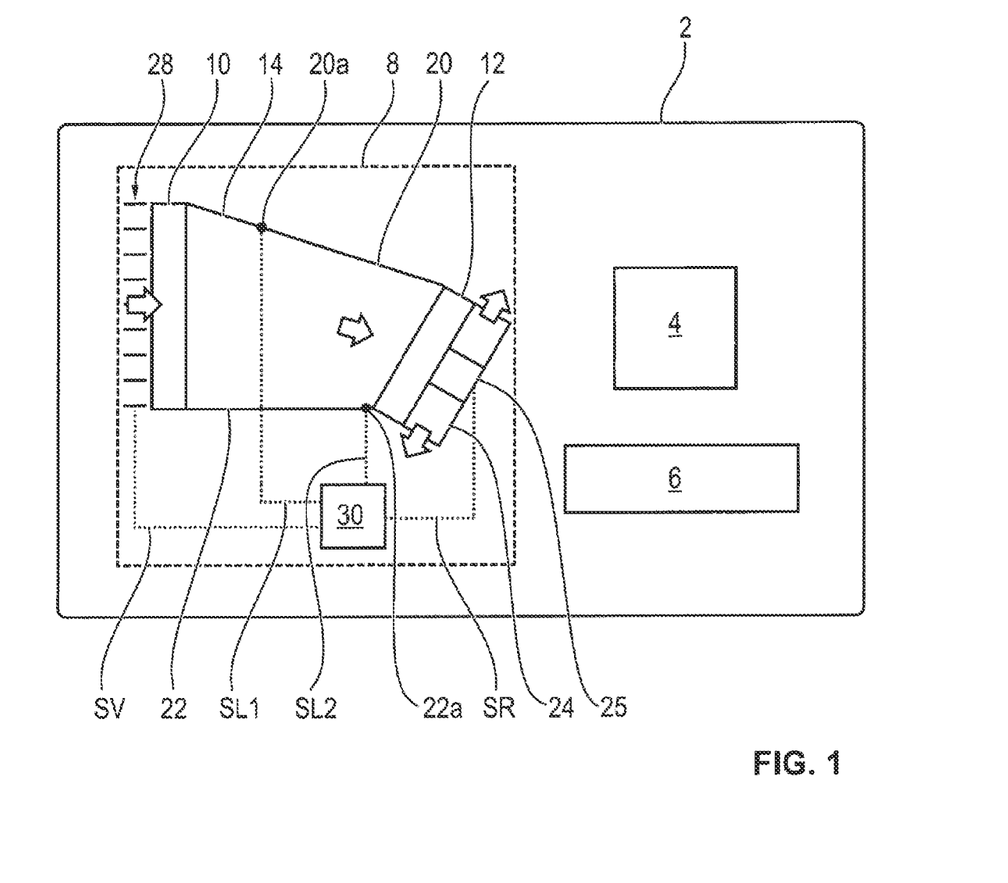
FIG. 1 shows an electrically operated motor vehicle with a battery which feeds an electric motor and with a cooling device.

FIG. 1 shows, in a schematic and simplified illustration, an electrically operated or electric-motor-operated motor vehicle 2, in particular an electric vehicle. The motor vehicle 2 has an electric motor 4 as drive system and has a battery 6 as electrical energy store for providing a supply to the electric motor 4. For cooling the electric motor 4 and/or the battery 6, the motor vehicle furthermore has a cooling module or a cooling device 8 as cooler system or cooler fan system. By means of the cooling device 8, relative wind is strengthened or, if the motor vehicle 2 is at a standstill, an air stream is generated. The relative wind or the air stream is illustrated schematically in the figures by arrows.

Below, information pertaining to the spatial directions, also in particular in a coordinate system of the motor vehicle (vehicle coordinate system), is given with regard to an exemplary installation situation between a cooler grille and an electric motor or a battery. The abscissa axis (X-axis, X-direction) is in this case oriented along the vehicle longitudinal direction (direction of travel), and the ordinate axis (Y-axis, Y-direction) is oriented along the vehicle transverse direction, and the applicate axis (Z-axis, Z-direction) is oriented along the vehicle height.

The cooling device 8 comprises a first heat exchanger, referred to hereinafter as cooler 10, and a second heat exchanger, referred to hereinafter as cooler 12. The heat exchanger or cooler 10 is oriented toward a vehicle front side. The cooler 12 is arranged oriented toward the vehicle interior, in particular toward the electric motor 4 and the battery 6.

Between the coolers 10 and 12, there is provided an air-guiding channel 14 which connects said coolers. The air-guiding channel 14 has two lateral passage openings 16 and 18 (FIG. 3, FIG. 4), which are arranged diametrically opposite one another at the air-guiding channel 14. The passage opening 16 is formed in the upper side wall of the air-guiding channel 14, that is to say in the side wall with a relatively high arrangement along the vehicle height (Z). The passage opening 18 is formed correspondingly oppositely in the lower side wall of the air-guiding channel 14, that is to say in the side wall with a relatively low arrangement along the vehicle height (Z).

Figure 2:
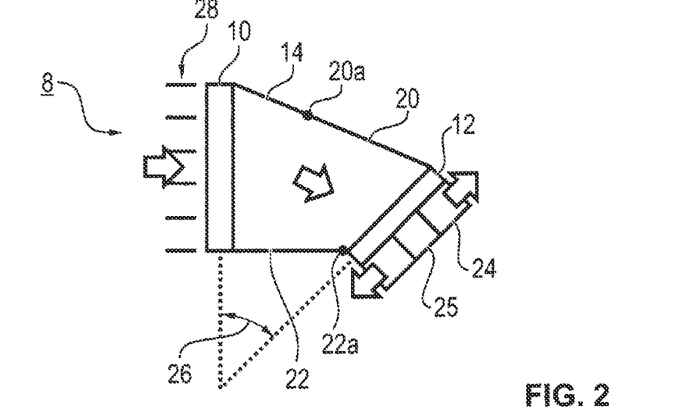
FIG. 2 shows the cooling device in a first setting.
Figure 3:
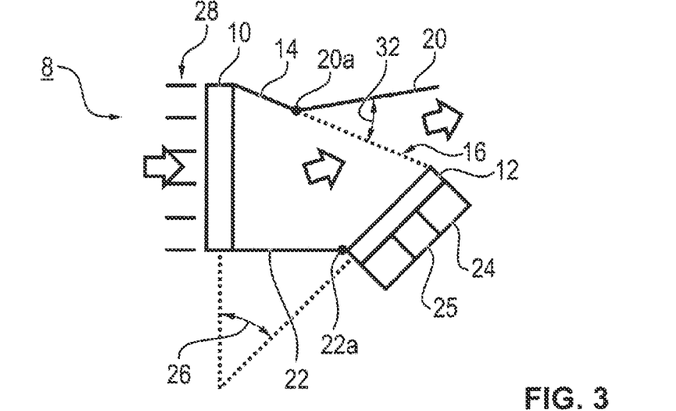
FIG. 3 shows the cooling device in a second setting.
Figure 4:
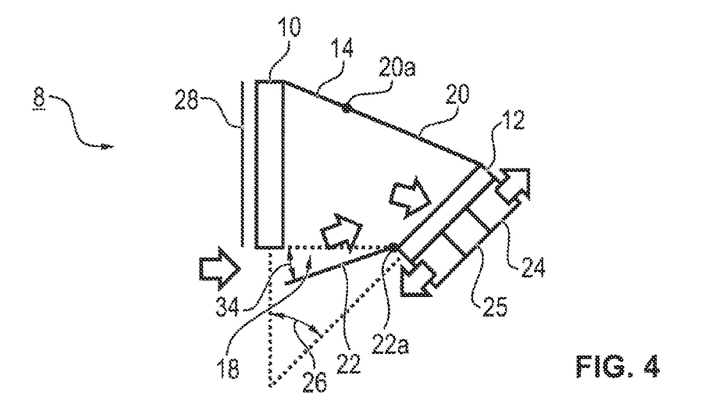
FIG. 4 shows the cooling device in a third setting.

The passage openings 16, 18 can be covered or closed off in terms of flow or in terms of flow dynamics by means of in each case one flap-like air guide 20, 22. In this case, the air guides 20, 22 are in particular each in the form of a flap or cover which can be pivoted or moved about a rotation or pivot axis 20a, 22a, for example in the form of a diverting plate or diverting flap. In this case, the air guides 20, 22 can each be moved or pivoted between a closed position (FIG. 2) and an open position (FIG. 3, FIG. 4).

In the closed position, the passage openings 16, 18 are closed off in terms of flow by the in each case assigned air guide 20, 22. Consequently, in the closed position, no air stream can flow through the closed-off passage openings 16, 18. In the respective open position, the air guides 20, 22 have been pivoted or moved in such a way that the passage openings 16, 18 are at least partially open, so that an air stream can laterally enter or exit the air-guiding channel 14.

The air guides 20 and 22 are arranged oppositely and so as to be rotated through 180° with respect to one another. This means that the air guides 20, 22 are arranged approximately point-symmetrically; with respect to one another on the air-guiding channel 14. The (upper) air guide 20, which closes off the passage opening 16, pivots or opens counter to the vehicle longitudinal direction (X) and along the vehicle height (Z). The air guide 20 therefore opens the air-guiding channel 14 rearwardly and upwardly (FIG. 3). The (lower) air guide 22, which closes off the passage opening 18, correspondingly pivots or opens in the vehicle longitudinal direction (X) and counter to the vehicle height (Z). Thus, when the second air guide 22 is open, the air-guiding channel 14 is forwardly and downwardly open (FIG. 4).

With respect to the direction of travel (X) of the motor vehicle 2, that is to say with respect to the main movement direction thereof, the coolers 10 and 12 have a front side and a rear side. The front side of the cooler 10 in this case faces for example a cooler grille, wherein the rear side of the cooler 12 opens out into the air-guiding channel 14 and thus faces the front side of the cooler 12.

A radial fan 24 is arranged as a cooler fan on the rear side of the cooler 12. Here, the inlet of the radial fan 24 adjoins the rear side of the cooler 12. The radial fan 24 has an electromotive drive 25.

The cooler 10 may be arranged substantially parallel to a vehicle front, that is to say parallel to the YZ-plane of the motor vehicle 2. Here, the cooler 10 is arranged in particular behind a cooler grille (not shown in any more detail) of the motor vehicle 2. The cooler 12 is arranged inclined at an inclination angle 26 in relation to the cooler 10 (FIG. 2 to FIG. 4). This means that the coolers 10 and 12 are arranged not parallel but rather obliquely or tilted with respect to one another.

The cooler 12 has a reduced cross-sectional area in comparison with the cooler 10. In other words, the cooler 12 has a smaller flow cross section than the cooler 10.

At the front side, the cooler 10 can be closed off in terms of flow or in terms of flow dynamics by means of a closure device 28. In the exemplary embodiment shown, the closure device 28 is in the form of a louvered screen, that is to say in the form of an arrangement of movable slats.

Cooling tubes or cooling hoses (not shown in any more detail) in which a coolant (a cooling liquid) which is kept in circulation by means of a pump (not illustrated) is situated are led to the coolers 10, 12. The coolant is conducted through the electric motor 4 and the battery 6 and is heated thereby, wherein the electric motor 4 and the battery 6 are cooled. The heated coolant is conducted through the coolers 10 and 12 again.

The cooling device 8 has a controller 30 as control unit or control device, which controls and/or regulates the operation of the cooling device 8. For this purpose, the air guides 20, 22 and the closure device 28 and also the radial fan 24 are configured to be controllable and/or regulable. This means that, during the operation of the cooling device 8, the controller 30 sends corresponding activation/control signals SR, SV, SL1, SL2 to the radial fan 24, or the drive 25 thereof, and to the closure device 28 and also to the air guides 20, 22.

By means of the control signals SR, the radial fan 24, or the electromotive drive 25 thereof, can be switched on and off, and in particular the rotational speed of the drive 25 is set, and/or regulated, by way of the control signal SR. The control signals SV open or close the closure device 28. The control signals SL1 open or close the upper air guide 20, and the control signals SL2 open or close the lower air guide 22. For the opening and closing, that is to say for the actuation, of the closure device 28 and/or air guides 20, 22, these are in each case coupled to an actuation means (not shown in any more detail), for example to an electric motor.

The air guide 20 may additionally or alternatively be configured for pressure-controlled actuation. In other words, the air guide 20 can be pivoted in a pressure-controlled manner between the closed position and the open position. For this purpose, the air guide 20 is in particular in the form of a dynamic pressure flap and designed and dimensioned so as to be pushed open with sufficiently strong relative wind. In this way, it is possible for the air guide 20 to be actuated even without activation of an actuation means, that is to say without the control signals SL1, that is to say passively.

The activation of the components 20, 22, 24 and 28 is realized here in a manner dependent on the driving situation, the respective working range, the work load (for example in the case of uphill driving and/or in the case of travel with a trailer) and in a manner dependent on the speed of the motor vehicle 2. The control and/or regulation of the cooling device 8, that is to say the method for operating the cooling device 8, is discussed in more detail below on the basis of FIG. 2 to FIG. 4.

The cooling device 8 is suitable and configured for being switched between three flow paths of the air-guiding channel 14. This switching is regulated and/or controlled in particular by the controller. The switching from one flow path to another is realized here in a manner dependent on the working range and/or on the speed of the motor vehicle.

Different cooling powers of the cooling device 8 are realized by way of the different flow paths. The flow paths therefore correspond to different operating settings or operating modes of the cooling device 8, which are able to be set according to the respective operating or driving situation.

The first flow path of the air-guiding channel 14 or the first setting of the cooling device 8 is suitable and configured for high cooling powers at high temperature loads (high-temperature requirements), in particular in the case of a vehicle standstill, such as in the case of a charging or rapid charging process of the battery 6. In such an operating situation, no relative wind is available, and so the cooling device 8 generates a cooling air stream by means of the radial fan 24 via both coolers 10, 12.

The second flow path of the air-guiding channel 14 or the second setting of the cooling device 8 is provided, for example, for high cooling powers, such as in the case of the motor vehicle 2 being driven at high or maximum vehicle speed (high-speed driving). In such an operating situation, the cooling device 8 is in a passive operating state in which the electric motor 4 and/or the battery 6 are/is cooled in a fan-free manner by way of the flow of relative wind through the cooler 10.

The third flow path of the air-guiding channel 14 or the third setting of the cooling device 8 is provided in particular for low or moderate cooling powers, for example in the case of slow driving or in the case of a standstill of the motor vehicle 2. In this setting, an air stream guided only via the cooler 12 is generated by the radial fan 24. This operation is a particularly efficient and very low-noise operation.

The three different flow paths or settings are shown in FIGS. 2 to 4, and combinations of these three flow paths or settings are also possible. The switching between the flow paths is realized in particular continuously, and so it is also the case that any intermediate position between the flow paths can be set.

FIG. 2 shows the first flow path of the air-guiding channel 14, or the first setting of the cooling device 8, in the case of which the closure device 28 is open and the air guides 20, 22 are closed and the radial fan 24 is switched on. The first flow path thus extends from the cooler 10 along the longitudinal direction of the air-guiding channel 14 to the cooler 12 and the radial fan 24. Consequently, during the operation of the radial fan 24, in this position/setting of the cooling device 8, air is sucked in axially via both coolers 10, 12, so that a relatively high cooling power is possible.

FIG. 3 illustrates the second flow path of the air-guiding channel 14, or the second setting of the cooling device 8, in the case of which the closure device 28 is open and the air guide 20 is open and the air guide 22 is closed and the radial fan 24 is switched off. In this case, the air guide 20 has been pivoted through a pivot angle 32 about the pivot axis 20a from the closed position into the opening position, so that the air-guiding channel 14 is opened toward the vehicle rear side. Consequently, the air stream or the relative wind can flow through the passage opening 16 past the obliquely positioned cooler 12.

In the second setting, the axial air stream flowing through the cooler 10 blocks the radial fan 24, so that the air stream or the relative wind is substantially blocked in the direction of the cooler 12 and of the radial fan 24. Consequently, the air stream or the relative wind is guided from the cooler 10 along the longitudinal direction of the air-guiding channel 14 via the first passage opening 16.

The third flow path of the air-guiding channel 14 or the third setting of the cooling device 8 is shown in FIG. 4. In this setting, the closure device 28 and the air guide 20 are closed, the air guide 22 is open and the radial fan 24 is switched on. In this case, the air guide 22 has been pivoted through a pivot angle 34 about the pivot axis 22a from the closed position into the opening position, so that the air-guiding channel 14 is opened toward the vehicle front side.

The pivot angle 34 of the air guide 22 in the third setting is (in terms of magnitude) smaller than the pivot angle 32 of the air guide 20 in the second setting.

In the third setting, the air stream enters the air-guiding channel 14 not via the cooler 10 but via the passage opening 18. Thus, during operation, the radial fan 24 sucks in air via the passage opening 22 and the cooler 12.

According to the method, it is provided that switching is realized between the flow paths of the air-guiding channel 14 or the settings of the cooling device 8 in a manner dependent on the working range, the electromotive load, the respective driving cycle and/or the speed of the motor vehicle 2, such that an optimum cooling power is provided for each operating situation.

For this purpose, a threshold value is stored in a memory of the controller 30. During operation, the controller 30 receives sensor signals from the electric motor 4 and/or from the battery 6, on the basis of which it determines for example a measure of the vehicle speed or of the working range of the motor vehicle 2. During operation, the controller 30 compares this determined measure with the stored threshold value, and transmits, in a manner dependent on this threshold value comparison, the control signals SR, SV, SL1, SL2, so that the different flow paths—and consequently cooling powers—are set.

Below, a description is given of an exemplary embodiment of the method according to the vehicle speed.

Above the threshold value, that is to say above a determined speed value of the motor vehicle 2, the controller switches to the second flow path or to the second setting. Here, the threshold value may be dimensioned in such a way that, if reached or exceeded, a sufficiently strong relative wind for the cooling is available.

This means that, upon reaching or exceeding of the threshold value, the radial fan 24 is switched off, the air guide 20 and the closure device 28 are opened, and the air guide 22 is closed. Thus, the cooling device 8, for example in the case of high-speed driving, is set to the second flow path. In the case of a relatively high, high and/or maximum vehicle speed, that is to say in the case of high-speed driving or in the case of high loading of the electric motor, for example in the case of uphill driving and/or in the case of additional stress due to a trailer pulled by the vehicle, the passive operation by way of the flow of relative wind through the cooler 10 is relatively suitable for cooling the electric motor 4 and/or the battery 6.

Below the threshold value of the speed, for example in the case of slow driving or of a standstill of the motor vehicle 2, the air guide 20 and the closure device 28 are closed, the air guide 22 is opened, and the radial fan 24 is switched on. In this way, a sufficient cooling power is ensured for example at a red traffic light or in a traffic jam, in the case of which there is insufficient relative wind for cooling.

If the battery 6 of the motor vehicle 2 is being charged, that is to say if the motor vehicle 2 is in a charging or rapid charging mode, the controller 30 switches the cooling device 8 to the first flow path. During the charging process, the battery 6 is fed with high electrical currents, wherein the resulting high temperature load can be cooled reliably and operationally safely by way of the high cooling power of the first setting.

In the charging mode, or during charging operation, the controller 30 controls the components 20, 22, 24, 28 in such a way that the closure device 28 is open, the air guides 20, 22 are closed, and the radial fan 24 is switched on. The air stream generated and conveyed by the radial fan 24 is guided both through the cooler 10 and through the cooler 12, so that a relatively high cooling power is realized. Consequently, the battery 6 is also cooled reliably and operationally safely during a rapid charging process.

The claimed invention is not restricted to the above-described exemplary embodiments. Rather, other variants of the invention may also be derived therefrom within the scope of the disclosed claims by a person skilled in the art, without departing from the subject matter of the claimed invention. In particular, all the individual features described in conjunction with the various exemplary embodiments may furthermore also be combined with one another in some other way within the scope of the disclosed claims, without departing from the subject matter of the claimed invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Motor vehicle
4 Electric motor
6 Battery
8 Cooling device
10, 12 Heat exchanger/cooler
14 Air-guiding channel
16, 18 Passage opening
20, 22 Air guide
20a, 22a Rotation/pivot axis
24 Cooler fan/radial fan
25 Drive
26 Inclination angle
28 Closure device
30 Controller
32, 34 Pivot angle
SR, SV, SL1, SL2 Control signal While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A cooling device configured to cool an electrically driven or drivable motor vehicle, the cooling device comprising:
a first heat exchanger and a second heat exchanger;
an air-guiding channel connecting the first heat exchanger to the second heat exchanger and forming two diametrically opposite passage openings each configured to be reversibly closed off and opened up by a first air guide and a second air guide; and
a cooler fan arranged behind the second heat exchanger with respect to a direction of air flow, and
wherein the first air guide is pressure-controlled to be passively opened via air pressure of the air flow;
wherein two diametrically opposite passage openings are arranged transversely or radially to a longitudinal direction extending between the heat exchangers on side surfaces of the air-guiding channel;
wherein the passage openings can be reversibly closed off and opened up by a first air guide and by a second air guide; and
wherein the first air guide and the second air guide are each configured to swivel about a swivel axis, and the first air guide is arranged at a rotation angle of 180° relative the second air guide.

2. The cooling device of claim 1, wherein the cooler fan is a radial fan.

3. The cooling device of claim 1, wherein the second heat exchanger is inclined at an inclination angle with respect to the first heat exchanger.

4. The cooling device of claim 1, wherein the first and second air guides are arranged point-symmetrically with respect to one another.

5. The cooling device of claim 1, further comprising:
a closure device configured to close off the first heat exchanger with respect to the direction of air flow.

6. A cooling device configured to cool an electrically driven or drivable motor vehicle, the cooling device comprising:
a first heat exchanger and a second heat exchanger arranged downstream of the first heat exchanger, as well as a cooler fan arranged behind the second heat exchanger with respect to a direction of air flow;
wherein the first heat exchanger and second heat exchanger form end faces of an air-guiding channel;
wherein the first heat exchanger is parallel to a plane of a transverse vehicle direction and a vehicle height direction;
wherein the second heat exchanger is inclined at an inclination angle of 30° to 60° with respect to the first heat exchanger;
wherein two diametrically opposite passage openings are arranged transversely or radially to a longitudinal direction extending between the heat exchangers on side surfaces of the air-guiding channel;
wherein the passage openings can be reversibly closed off and opened up by a first air guide and by a second air guide;
wherein the first air guide and the second air guide are each configured to swivel about a swivel axis, and the first air guide is arranged at a rotation angle of 180° relative the second air guide.

7. The cooling device of claim 1, wherein first air guide and the second air guide are collectively configured to switch the air-guiding channel between three flow paths.

8. A method of operating a cooling device of a motor vehicle, the method comprising:

receiving, by a controller, signals indicative of a working range of the motor vehicle or a speed of the motor vehicle;

switching on a cooler fan; and actuating a first air guide and/or a second air guide based on the working range and/or the speed of the motor vehicle, wherein in response to the speed of the motor vehicle exceeding a first threshold value the cooler fan is switched off, the first air guide is opened, and the second air guide is closed, wherein in response to the speed of the motor vehicle falling below the first threshold value the first air guide is closed, the second air guide is opened, and the cooler fan is switched on;

wherein two diametrically opposite passage openings are arranged transversely or radially to a longitudinal direction extending between heat exchangers disposed on side surfaces of an air-guiding channel;

wherein the passage openings can be reversibly closed off and opened up by a first air guide and by a second air guide; and wherein the first air guide and the second air guide are each configured to swivel about a swivel axis, and the first air guide is arranged at a rotation angle of 180° relative the second air guide.

9. The method of claim 8, further comprising:
closing the first and second air guides; and
switching on the cooling fan in response to a charging operation of a chargeable battery configured to power an electric motor of the motor vehicle.

10. The cooling device of claim 7, wherein the cooler fan, the first air guide, and the second air guide are collectively configured to switch the air-guiding channel between three flow paths.

11. The cooling device of claim 10, wherein the air-guiding channel is configured to form a first air path of the three flow paths, in which the first air guide and the second air guide are each closed and the cooler fan is switched on when the motor vehicle is at a standstill.

12. The cooling device of claim 11, wherein the air-guiding channel is configured to form a second air path of the three flow paths, in which the first air guide is open, the second air guide is closed, and the cooler fan is switched off when the motor vehicle is in motion.

13. The cooling device of claim 7, wherein the closing off step, the opening up step, and the switching step are each performed in response to the motor vehicle being at a standstill.

14. The cooling device of claim 6, wherein the first air guide is pressure-controlled.

* * * * *